United States Patent [19]

Yamada

[11] 4,325,615
[45] Apr. 20, 1982

[54] EXPOSURE CONTROL SYSTEM FOR SINGLE LENS REFLEX CAMERAS

[75] Inventor: Seiji Yamada, Sakai, Japan

[73] Assignee: Minolta Camera Kabushiki Kaisha, Osaka, Japan

[21] Appl. No.: 258,027

[22] Filed: Apr. 27, 1981

Related U.S. Application Data

[63] Continuation of Ser. No. 62,507, Jul. 31, 1979, Pat. No. 4,284,341.

[30] Foreign Application Priority Data

Aug. 9, 1978 [JP] Japan .................................. 53-96847

[51] Int. Cl.³ ...................... G03B 7/083; G03B 7/099; G03B 15/05
[52] U.S. Cl. ........................................ 354/24; 354/33; 354/51
[58] Field of Search ..................... 354/24, 31, 32, 33, 354/51

[56] References Cited

U.S. PATENT DOCUMENTS

| | | | |
|---|---|---|---|
| 3,842,424 | 10/1974 | Tsunekawa et al. | 354/31 |
| 4,079,389 | 3/1978 | Hashimoto et al. | 354/33 |
| 4,104,654 | 8/1978 | Maitani et al. | 354/31 |

*Primary Examiner*—Michael L. Gellner
*Attorney, Agent, or Firm*—Watson, Cole, Grindle & Watson

[57] ABSTRACT

A through-the-lens type automatic exposure control system controls exposure time in accordance with an object light representative signal stored in a storage device prior to a shutter actuation, with respect to exposure time faster than a given value, and in accordance with the output of a light measuring circuit measuring the object light passing through the camera objective and reflected from a film surface, with respect to exposure time slower than the given value. In response to a manual operation, the light signal is stored in the storage device independently of camera release operation, with the exposure time being controlled in accordance with the stored signal regardless of the exposure time.

8 Claims, 3 Drawing Figures

EXPOSURE CONTROL SYSTEM FOR SINGLE LENS REFLEX CAMERAS

This is a continuation of application Ser. No. 62,507 filed July 31, 1979, now U.S. Pat. No. 4,284,341.

BACKGROUND OF THE INVENTION

1. Field of the Invention

The present invention relates to a through-the-lens or interior-light-measurement type automatic exposure control system for a single lens reflex camera, and more particularly it pertains to an automatic exposure control system which controls exposure time in accordance with an output from a light measuring device that measures scene light or object light passing through the camera objective and reflected from the film surface.

2. Description of the Prior Arts

A camera exposure control system is known which controls exposure time as a function of scene light passing through the camera objective and reflected from the film surface and/or a surface of a focal plane shutter member having practically the same light reflection characteristics as those of the film surface. Such an exemplary camera exposure control system is shown in U.S. Pat. No. 3,687,026, the disclosure of which is incorporated herein by reference.

The exposure control system of the film-reflection-light measuring type as mentioned above has many advantages over other types of exposure control systems. For instance, through-the-lens light measurement can be carried out simultaneously with film exposure. The scene light is detected by that part of the light to which the film is currently being exposed. This may be compared with a storage type exposure control for single lens reflex cameras wherein a light measuring circuit measures the scene light through the camera objective prior to film exposure. The output from the light measuring circuit is stored in a storage device such as a capacitor before the light measuring photocell is blocked from the scene light by the movement of the reflex mirror from its viewing to photographing position, so that exposure is controlled in accordance with the stored output.

Further, simultaneous or real time light measurement by film-reflection-light type measurement enables the amount of light emitted from an electronic flash device to be controlled in accordance with through-the-lens type light measurement, since the flash light to be measured and controlled is produced during a camera exposure. This flash control is effective particularly in close-up photography and bounce light photography.

Also, film-reflection-light type measurement has an advantage that the measurement is not affected by the light entering from the view-finder eyepiece when it is employed in a single lens reflex camera, because the reflex mirror of the camera at its photographic position blocks such light during film exposure when the light measurement is taking place.

However, such light measuring type systems do not perform the function of storing the measured values as is done by the storage type exposure control systems. It is sometimes desirable that exposure is controlled in accordance with light measurement carried out separately from the film exposure, for an object portion and at the time selected by the photographer. For example, the photographer may wish to take a picture with an exposure condition suitable for a particular portion of a scene which is not covered by the light acceptance angle of a photocell when the camera is aimed at the scene, or which is smaller than the area covered by the light acceptance angle. With the storage type exposure control system, light measurement taken with the light acceptance angle being matched with the desired portion of the scene may be fixed independently of the film exposure by manually causing storage of the light measurement signal, and exposure may be controlled in accordance with the stored measurement signal.

SUMMARY OF THE INVENTION

It is a primary object of the present invention to provide an exposure control system having advantages of both the film-reflection-light measuring type and the storage type exposure control systems.

It is another object of the present invention to provide an exposure control system which controls exposure time in dependence upon the film-reflection-light measurement at the time of film exposure and/or the light measurement taken and stored independently of the film exposure.

It is a further object of the present invention to enable an exposure control system to control exposure time in accordance with a light representative signal stored in a storage device as well as with an output of a light measuring circuit which is measuring scene light passing through the camera objective and reflected from the film surface and/or a surface of a focal plane shutter member.

It is still another object of the present invention to provide an automatic exposure time control system comprising a shutter control circuit which controls exposure time in a first stage in accordance with a light related signal stored in a storage device and then, after a given time has passed, in accordance with an output of a light measuring circuit which measures scene light passing through the camera objective and reflected from the film surface, the control system being settable to be responsive only to the stored signal.

It is still a further object of the present invention to provide a switch arrangement for selectively connecting a shutter control circuit to a storage device for storing a light signal, and to a light measuring circuit for measuring scene light via the camera objective and film surface, and/or surface of a focal plane shutter member.

According to a feature of the present invention, a single lens reflex camera comprises a reflex mirror; a light measuring device having a photocell receiving scene light via the camera objective and the reflex mirror with the mirror at the viewing position, the photocell receiving scene light via the camera objective and the surface of the film with the mirror at the photographing position thereof; a storage device for storing the output of the light measuring circuit generated when the photocell receives the scene light via the camera objective and the reflex mirror; and a shutter control circuit connected to the storage device and switched to direct connection with the light measuring circuit with the photocell receiving scene light via the camera objective and the film surface. It is to be noted that the photocell may receive scene light traversing a semi-transparent portion of the reflex mirror or reflected by the mirror.

According to an embodiment of the present invention, a single lens reflex camera is provided with the following components. A leading and a trailing shutter curtain for a focal plane shutter, the leading curtain having at the central portion of its front surface a highly reflective portion. A movable reflecting mirror having a semi-transparent portion through which, at the viewing position of the mirror, scene light passes to the reflective portion of the leading shutter curtain to be reflected thereby. A light measuring circuit having a photocell receiving the light reflected from the reflective portion of the leading shutter curtain. A storage device for storing the output of the light measuring circuit in response to a shutter release operation. A shutter control circuit for controlling exposure time in a first operational stage in response to the output stored in the storage device and directly in response to an output of the light measuring circuit after the leading shutter curtain has traveled a given distance or extent when the photocell receives light reflected from the exposed film surface. In this embodiment the trailing shutter curtain may be released to start while the shutter control circuit is responsive to the stored output, if the scene light is high enough to provide a fast shutter speed. But, if the scene light is low enough to require a long exposure time, the shutter will be controlled chiefly in accordance with the output of the light measuring circuit with its photocell receiving light reflected from the film surface. If the photographer manually causes the storage of the output of the light measuring circuit independently of the shutter release operation, the shutter control circuit will be responsive only to the stored output whether the scene light is high or low, so that the photographer can take a picture depending on the light measurement effected separately from a camera exposure operation for a desired portion or area of a scene. Thus the camera operator can take a picture with an actually suitable exposure for a desired object on a light background.

These and other objects, advantages and features of the invention will become more apparent from a reading of the following description of the embodiments with reference to the accompanying drawings wherein:

DETAILED DESCRIPTION OF THE PREFERRED EMBODIMENTS

Figure 1:
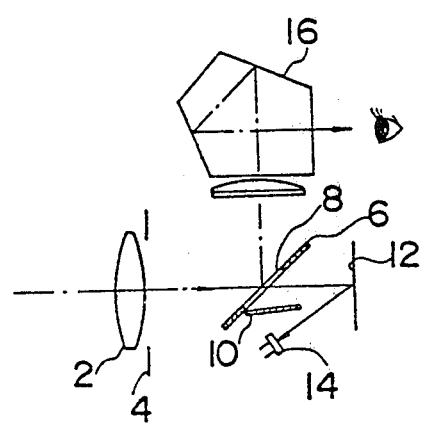
FIG. 1 is a schematic illustration of a camera optical system to which the present invention may be applied.
Figure 2:
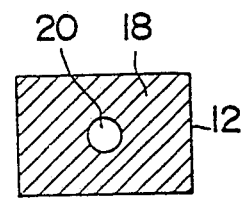
FIG. 2 is an illustration of the front surface of a shutter curtain.

With reference to FIG. 1, light from an object to be photographed passes through objective lens 2 and the aperture of diaphragm 4 from the left side as viewed in the Figure, and impinges on mirror 6 which has semi-transparent portion 8 at the central portion thereof to allow a part of the light to pass therethrough to shutter curtain 12 at the focal plane of objective lens 2. The remainder of the light is reflected by the mirror 8 to pentagonal prism 16 of a well-known view-finder system for a single lens reflex camera to provide a viewfinder image to be observed by the photographer. The front surface of shutter curtain 12 is formed with high reflective white color portion 20 as seen in FIG. 2, and the remaining dark and low reflective portion 18, so that photocell 14, disposed at the bottom of the camera body (not shown), receives the light passing through the semi-transparent portion 8 and reflected at high reflective portion 20. Mirror 6 is movable between a viewing position as shown in the Figure and a picture taking position as is well known in the art. Cover 10 is hinged on mirror 6, or a mirror supporting frame, to close semi-transparent portion 8 and block the stray light entering from a view-finder eyepiece when mirror 6 is at the picture taking position thereof. It will be apparent to those skilled in the art that shutter curtain 12 comprises a first or leading curtain traveling to initiate film exposure, and a second or trailing shutter curtain traveling to terminate the exposure, and that a light sensitive film may be disposed at the back of shutter curtain 12. In the present case, high reflective portion 20 is formed on both the first and second shutter curtains so that the object light may be measured before and after the film exposure.

Figure 3:
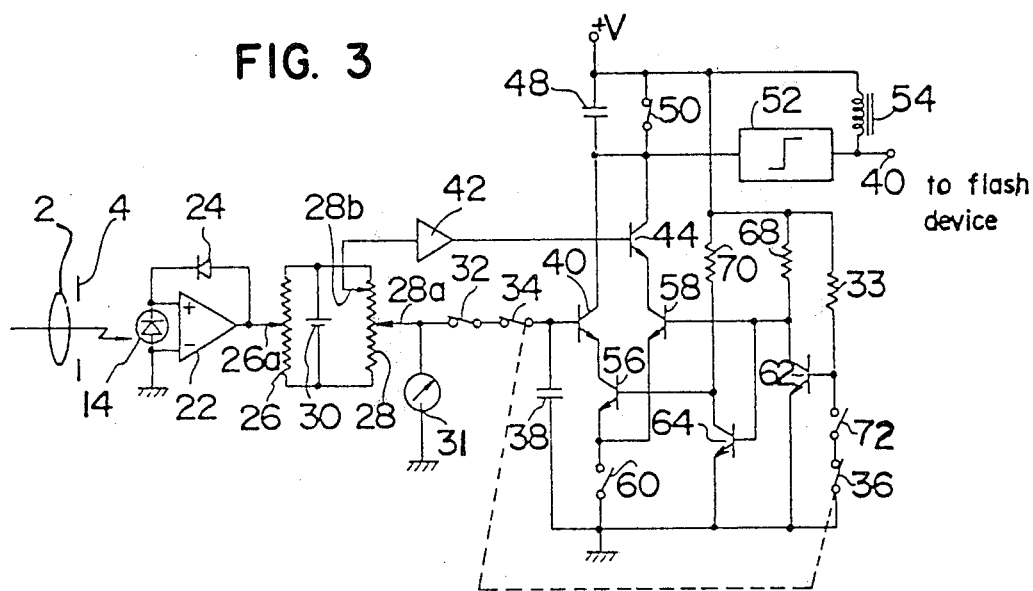
FIG. 3 is a circuit diagram of an automatic exposure control circuit according to a preferred embodiment of the present invention.

With reference to FIG. 3, a light measuring circuit comprises photocell 14 such as silicon blue cell receiving scene light through objective 2 and the aperture of diaphragm 4, operational amplifier 22 having a pair of inputs between which photocell 14 is connected, and logarithmic compression diode 24 connected in the feedback circuit for the amplifier so that a voltage proportional to the logarithm of the light incident on the photocell 14 is obtained at the output of the amplifier, i.e. the output of the light measuring circuit. Potentiometer 26 has slider 26a slidable in accordance with the film sensitivity setting. Potentiometer 28 has a pair of sliders 28a and 28b, with one slider 28a linked with a diaphragm aperture value preset member (not shown), and the other slider 28b settable in accordance with the reflecting power of the film in use or the difference in reflecting power between the film and the shutter curtain. Two potentiometers 26 and 28 are respectively connected across constant voltage source 30. Thus, a voltage is obtained at slider 28a corresponding to the exposure time suitable for the object light measured, the set film sensitivity and the preset diaphragm aperture value, when the aperture of diaphragm 4 is fully open. A voltage is obtained at slider 28b corresponding to an exposure time suitable for the set film sensitivity, the actual stopped-down diaphragm aperture and scene light measured through the diaphragm aperture and reflected from the film surface.

Indication circuit 31 indicates the exposure time to be controlled and comprises an ammeter or a digital display device.

Storage switch 32 is connected between slider 28a and storage capacitor 38 and is arranged to be opened in conjunction with the shutter release operation just before the initiation of the stopping-down operation of the diaphragm. Switches 34 and 36 are linked with each other and are manually openable at any desired time for the purpose of measuring a desired portion of a scene to be photographed. Storage capacitor 38 receives the voltage signal generated at slider 28a, through switches 32 and 34, to store the voltage signal when either of the switches is opened. First logarithmic expansion transistor 40 produces at its collector an electric current that is proportional to the anti-logarithm of the voltage stored in storage capacitor 38 and applied to the base of the transistor. Slider 28b is connected through impedance reducing circuit 42 to the base of transistor 44 which in turn functions as a second logarithmic expansion transistor for generating at its collector an electric current proportional to the anti-logarithm of its base voltage. First and second logarithmic expansion transistors 40 and 44, respectively, are associated with a transistor switch arrangement (described in detail hereinafter) such that first logarithmic expansion transistor 40 is actuated at the start of shutter opening, i.e. initiation of an exposure. And second logarithmic expansion transistor 44 is actuated in place of the first logarithmic expansion transistor when the leading shutter curtain travels a given distance. Second logarithmic expansion transistor 44 is deactuated upon the completion of travel of the trailing shutter curtain, i.e. upon termination of the exposure. The collectors of logarithmic expansion transistors 40 and 44 are connected with one end of integrating capacitor 48, which in turn starts to integrate the collector current of first logarithmic expansion transistor 40 with the opening of the shutter, and subsequently integrates the collector current of second logarithmic expansion transistor 44. Discharge switch 50 is connected across integrating capacitor 48 to discharge the latter and is opened in conjunction with the shutter opening. When the voltage across integrating capacitor 48 reaches a given level, switching circuit or threshold circuit 52 inverts its output, or turns off or on, to change the magnetic field of electromagnet 54 and allow the travel of the trailing shutter curtain for the termination of an exposure. In response to the attainment of the given voltage across integrating capacitor 48, the output of the circuit 52 may change from a high to a low level or vice-versa, and the electromagnet may be energized or de-energized depending on the design of the shutter control mechanism as is well known in the art.

Switching transistors 56 and 58 are arranged to be made conductive and non-conductive alternatively. The collectors of the transistors 56 and 58 are respectively connected with the emitters of transistors 40 and 44, with the emitters of the transistors 56 and 58 being grounded via switch 60. Switch 60 serves as a count switch which is closed upon shutter opening to initiate charging of integrating capacitor 48. The circuit comprising transistors 62 and 64, resistors 68 and 70 and switches 36 and 72 control the switching operation of switching transistors 56 and 58. Switch 72 is arranged to be open with the shutter at its cocked condition, and to be closed when the leading shutter curtain has traveled a certain distance, for example, when the leading shutter curtain has completed its travel across the exposure aperture of the camera. Accordingly, if switch 36 is closed, transistor 62 is made non-conductive and transistor 64 is made conductive to make transistor 56 non-conductive and transistor 58 conductive and actuate second logarithmic expansion transistor 44 when the leading shutter curtain has traveled a given distance.

During operation, the camera optical system assumes the position shown in FIG. 1 with the shutter at its charged condition. Thus, light from a scene or an object to be photographed passes through objective lens 2, the aperture of diaphragm 4 and the semi-transparent portion 8 of reflecting mirror 6, and is reflected from the high reflection portion 20 of the leading shutter member, with photocell 14 receiving a part of the reflected light. In such viewing condition of the camera, the switches are respectively positioned as shown in FIG. 3.

Upon depression of a release button to initiate camera operation, storage switch 32 is opened just prior to the initiation of the stopping-down operation of diaphragm 4 and of the movement of reflecting mirror from its viewing to picture taking position, so that the light signal generated at slider 28a is stored in storage capacitor 38. After the completion of the diaphragm stopping-down operation and the mirror movement, the leading shutter member is released to start travelling and count switch 60 is closed with the start of the leading shutter member. At this stage, switch 72 is still open so that transistor 62 is conductive and transistor 64 is non-conductive to keep transistor 56 conductive. Thus, at the stage when the first shutter curtain is uncovering the film surface, exposure time is controlled through first logarithmic expansion transistor 40 which is responsive to the signal stored in storage capacitor 38. If the object to be photographed has such a high brightness to require a fast shutter speed, for instance faster than 1/60 second, switching circuit 52 inverts its output to release the trailing shutter curtain before switch 72 is closed, so that exposure time is controlled only in accordance with the stored signal. On the other hand, in case an object brightness requires a slow shutter speed, for instance not faster than 1/60 second, switch 72 is closed when the leading shutter curtain has traveled a given distance, for instance to fully uncover the film, and second logarithmic expansion transistor 44 is connected in the circuit in place of the first logarithmic expansion transistor 40, so that exposure time is controlled in accordance with the output generated at slider 28b after the closure of switch 70. In this case, the output at slider 28b corresponds to a light measurement measured with respect to the light reflected by the film surface. It is to be noted that the slider 28b is set as a function of the reflecting power of the film surface in use to match the outputs of the light measuring circuit when the photocell 14 receives light via a focal plane shutter surface and when it receives the light via the film surface, such that substantially the same output may be obtained for the same object brightness in both cases.

The circuit shown in FIG. 3 may also be used for the control of flash duration. In this case, terminal 40 may be connected with a flash control circuit (not shown) but well known in the art. For example, the control circuit may include a thyrister serially connected with an electronic flash tube to stop the current flow through the tube, in response to the signal at terminal 40. As is common with electronic flash devices, the flash tube is fired in synchronization with the full opening of the shutter, i.e. the full uncovering of the film. Accordingly, the flash is fired after switch 70 is closed and second logarithmic expansion transistor 44 is in operation. After that, switching circuit 52 will invert its output to actuate electromagnet 54 and at the same time generate a stop signal 40 for interrupting the flash firing. Thus, the electronic flash is controlled in accordance with the output of the light measuring device which measures the light from the object (such light may include the flash light reflected by the object in the case of flash control) through the camera objective.

If the camera user wishes to take a picture of an object in a background brighter than the object, or take a picture with an exposure suitable for a particular portion of the scene to be photographed, he may open switches 34 and 36 manually, coming closer to the object, or changing the aim of the camera to match the area to be covered by the light acceptace angle for the photocell 14, with his desired portion of the scene. Thus, the output corresponding to the light measurement for a desired portion of the scene is stored in the storage capacitor. After that, the photographer may come back to a picture taking position and/or change the aim of the camera to aim at the scene with a desired composition and picture taking area. Then he may operate the shutter release button to open the shutter. In this case, the exposure time is controlled in accordance with the light signal stored in response to the manual operation whether the measured objected brightness is high or low, because switch 36 is open to maintain transistor 56 conductive and transistor 58 non-conductive regardless of the state of switch 72.

With the above construction, including the reflecting mirror 6 having semi-transparent portion 8 at its central portion and the focal plane shutter member 12 having light reflecting portion 20, a common light measuring system can be used for light measurement for the storage of light signals and for the measurement of the light reflected by the film surface, resulting in a simplification of the circuit arrangement.

As a further modification, the exposure control system of the present invention may employ two photocells or two groups of photocells, one photocell or group of photocells receiving the light reflected from the film surface, and the other photocell or group of photocells receiving, at a suitable position in or outside of the view-finder system, the light reflected by the reflex mirror and introduced to the finder system, with the shutter control system being switched, upon full uncovering of the film, from control dependent on a stored signal to that dependent on a film reflection light measurement. With this modification, the conventional focal plane shutter member without a light reflecting portion can be used. In this modification, the exposure calculation circuit and the logarithmic compression circuit can be commonly used for both photocells or for both groups of photocells, if the photocells are arranged to be switched upon, or with, switching from the storage device to the light measuring circuit.

As another modification, the highly light reflective portion 20 in FIG. 2 may be formed in the shape of a band extending in the direction of movement of the shutter member, so that the determination of the time when the switching takes place will be left to the designer's discretion.

It will be apparent to those skilled in the art that the focal plane shutter member is not limited to the two curtain type as disclosed, but may take the form of any one of various conventional types, such as for example, metal plates displaceable or shiftable in one direction, multiple blades foldable like a fan, or a pair of rotary disks. It will be also apparent that the electric circuit may also be modified or exchanged in various ways not inconsistent with the invention.

Although the invention has been described in its preferred form with a certain degree of particularity, it is understood that the present disclosure of the preferred embodiment may be changed in the details of construction, and the combination and arrangement of the components without departing from the spirit and the scope of the invention as hereinafter claimed.

What is claimed is:

1. In a single lens reflex camera, the combination comprising:
   a reflex mirror movable between viewing and photographic positions and having a portion enabling light passage;
   light receiving means for receiving scene light through said reflex mirror portion with said reflex mirror in said viewing position and receiving scene light reflected from the film in the camera with said reflex mirror in said photographic position;
   a light measurement means for generating a light measurement signal output as a function of the scene light received by said light receiving means;
   flash control means for controlling the termination of electronic flash tube firing in accordance with the light measurement signal generated with said reflex mirror in said photographic position;
   storage means for storing said light measurement signal output;
   means for causing the storing operation of said storage means in response to an arbitrary manual operation independent of camera actuating operation, with said reflex mirror in said viewing position; and
   exposure time control means for controlling exposure time in accordance with the light measurement signal stored in said storage means.

2. A single lens reflex camera as claimed in claim 1 wherein said light measurement means includes logarithmic compression means for generating an output signal proportional to the intensity of the light received by said light receiving means, and means for adjusting said output signal in accordance with a set film sensitivity to generate a logarithmically compressed and adjusted light measurement signal output, and said flash and exposure time control means respectively include logarithmic expansion means for generating a current proportional to the anti-logarithm of said light measurement signal output.

3. A single lens reflex camera as claimed in claim 2 further comprising means interposed between said light measurement means and said storage means for shifting the level of said light measurement signal output by an amount commensurate with a preset diaphragm aperture value.

4. A single lens reflex camera as claimed in claim 3 wherein said flash and exposure time control means include in common a means for integrating the current from said logarithmic expansion means.

5. A single lens reflex camera as claimed in claim 4 wherein said flash and exposure control means include in common a switching circuit responsive to the output of said means for integrating.

6. A single lens reflex camera as claimed in claim 1 wherein said portion enabling light passage includes a semi-transparent portion formed centrally on said reflex mirror.

7. A single lens reflex camera as claimed in claim 6 further comprising a focal plane shutter member having a light reflective portion and wherein said light receiving means is arranged to receive the scene light reflected from said light reflective portion.

8. A single lens reflex camera as claimed in claim 7 further comprising means for disabling said flash control means in response to said arbitrary manual operation.

* * * * *